(12) United States Patent
Ott et al.

(10) Patent No.: US 10,589,994 B2
(45) Date of Patent: Mar. 17, 2020

(54) BURNER AND PROCESS FOR PRODUCING SYNTHESIS GAS

(71) Applicant: L'Air Liquide, Societe Anonyme pour l'Etude et l'Exploitation des Procedes Georges Claude, Paris (FR)

(72) Inventors: Joerg Ott, Frankfurt am Main (DE); Veronika Gronemann, Karben (DE); Maik Lehmann, Frankfurt am Main (DE); Paul Manfred Krimlowski, Frankfurt am Main (DE)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/976,926

(22) Filed: May 11, 2018

(65) Prior Publication Data

US 2018/0327261 A1 Nov. 15, 2018

(30) Foreign Application Priority Data

May 11, 2017 (EP) .................................... 17400023

(51) Int. Cl.
*C01B 3/36* (2006.01)
*F23D 14/24* (2006.01)
(Continued)

(52) U.S. Cl.
CPC .............. *C01B 3/363* (2013.01); *B01J 19/24* (2013.01); *F23D 14/24* (2013.01); *F23D 14/32* (2013.01); *F23D 91/00* (2015.07); *F23L 7/005* (2013.01); *F23L 7/007* (2013.01); *B01J 2219/00157* (2013.01); *B01J 2219/24* (2013.01); *C01B 2203/025* (2013.01); *C01B 2203/0255* (2013.01); *C01B 2203/0816* (2013.01);
(Continued)

(58) Field of Classification Search
CPC ............ C01B 3/363; C01B 2203/0255; C01B 2203/0816; F23D 91/00; F23D 14/24; B01J 19/24; B01J 2219/24; B01J 2203/0255; B01L 2219/00157
See application file for complete search history.

(56) References Cited

U.S. PATENT DOCUMENTS 3,705,108 A * 12/1972 Marion et al. .......... C01B 3/363
                                                           252/373
4,351,647 A *  9/1982 Marion .................... C01B 3/363
                                                           252/373
(Continued)

FOREIGN PATENT DOCUMENTS

DE   10 2006 033441   1/2008
DE   10 2006 059149   6/2008
DE   10 2010 004787   7/2011

*Primary Examiner* — Paul A Wartalowicz
(74) *Attorney, Agent, or Firm* — Justin K. Murray

(57) ABSTRACT

A burner for producing synthesis gas by partial oxidation of liquid or gaseous, carbon-containing fuels in the presence of an oxygen-containing oxidant and a moderator, which burner can be operated uncooled, i.e. without a fluid coolant being passed through the burner, is proposed. Steam or carbon dioxide or else mixtures of these materials are used as moderator. This is achieved by the feed channels being configured so that mixing of the fuel, the moderator and the oxidant occurs only outside the burner.

11 Claims, 1 Drawing Sheet

(51) Int. Cl.
  *F23D 99/00* (2010.01)
  *B01J 19/24* (2006.01)
  *F23D 14/32* (2006.01)
  *F23L 7/00* (2006.01)

(52) U.S. Cl.
  CPC ............... *F23L 2900/07002* (2013.01); *F23L 2900/07005* (2013.01); *F23L 2900/07009* (2013.01); *Y02E 20/344* (2013.01)

(56) References Cited

U.S. PATENT DOCUMENTS

| | | | | |
|---|---|---|---|---|
| 5,261,602 A | * | 11/1993 | Brent | C01B 3/363 110/347 |
| 5,549,877 A | * | 8/1996 | Gateau | B01J 8/0278 422/129 |
| 2008/0262111 A1 | * | 10/2008 | Ploeg | C10J 3/485 518/704 |
| 2009/0272821 A1 | * | 11/2009 | Guo | B01F 5/0659 239/399 |

* cited by examiner

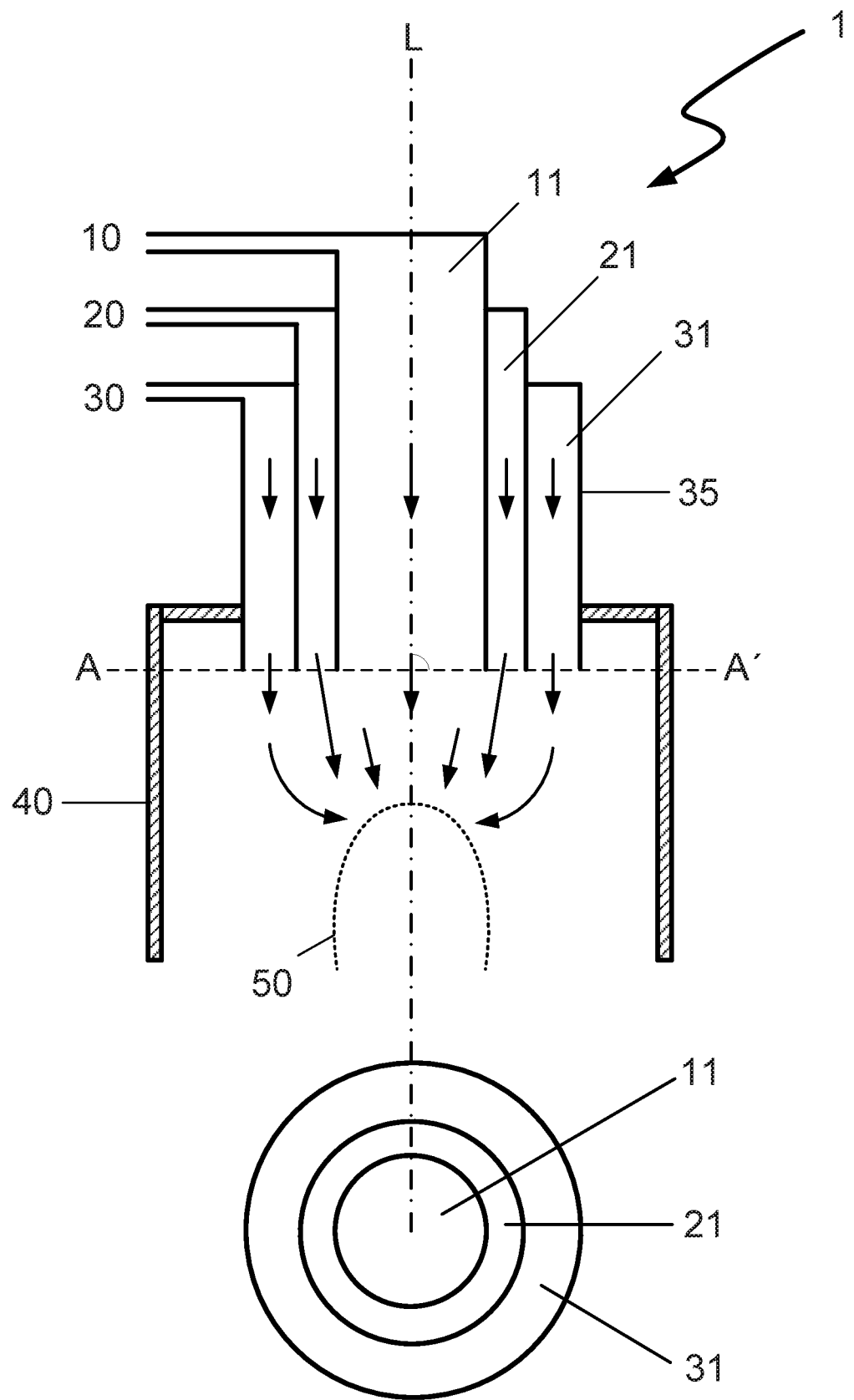

BURNER AND PROCESS FOR PRODUCING SYNTHESIS GAS

CROSS-REFERENCE TO RELATED APPLICATIONS

This application claims the benefit of priority under 35 U.S.C. § 119 (a) and (b) to EP patent application No. EP 17400023.2, filed May 11, 2017, the entire contents of which are incorporated herein by reference.

FIELD OF THE INVENTION

The invention relates to a burner for producing synthesis gas by partial oxidation of liquid or gaseous, carbon-containing fuels in the presence of an oxygen-containing oxidant and a moderator, where steam or carbon dioxide or else mixtures of these materials can be used as moderator. The burner of the invention can be operated uncooled, i.e. without passing a liquid coolant through it.

The invention further relates to a process for producing synthesis gas by partial oxidation or autothermal reforming of hydrocarbon-containing, gaseous or liquid starting materials using the burner of the invention.

BACKGROUND

The term synthesis gases refers to gas mixtures which contain hydrogen and carbon oxides and are used in various synthetic reactions. Examples are the synthesis of methanol, the preparation of ammonia by the Haber-Bosch process or the Fischer-Tropsch synthesis.

A widely used process for producing synthesis gases is the autothermal entrained flow gasification of gaseous, liquid or solid fuels, as is described, for example, in DE 10 2006 059 149 B4. At the top of a reactor, an ignition and pilot burner is arranged centrally and three gasification burners are arranged rotationally symmetrically around the reactor axis. Coal dust together with oxygen and steam as gasification agent are fed via the gasification burners into a gasification space of the reactor in which the fuel is converted into synthesis gas. The hot gasification gas leaves the gasification space together with the liquid slag and goes into a quenching space into which water is sprayed in order to cool crude gas and slag. The slag is deposited in the water bath and is discharged via a slag discharge. The quenched crude gas is taken off saturated with water vapour from the quenching space and purified in subsequent purification stages. Since the fuel is reacted directly with the oxidant, oxidant and fuel have to be fed in coaxially or coannularly.

U.S. Pat. No. 5,549,877 A1, too, describes a process and an apparatus for producing synthesis gas, wherein an oxygen-containing oxidant is fed in centrally at the top of the reactor and is introduced together with fuel fed in annularly around the oxidant inlet into the reaction space in which the fuel is firstly reacted substoichiometrically. A flame is formed and this spreads downwards into the reaction space. In a recirculation zone, the materials present in the flame flow back upwards. An additional stream of oxidant is fed into the reaction zone downstream via an annular conduit, so that a larger flame zone is formed.

DE 10 2006 033 441 A1 describes a reformer for a fuel cell system, in which a fuel is introduced into an oxidation zone through a centrally arranged fuel inlet and an oxidant, in particular air, is also introduced via oxidant feed devices provided perpendicularly thereto. Within the oxidation zone, reaction of fuel and oxidant takes place in the form of combustion. The product gas formed then goes downstream into a mixing zone in which fuel and oxidant are additionally introduced by means of a secondary fuel feed device. The product gas mixed with the additional fuel goes into a reforming zone in which it is converted by endothermic reaction into a hydrogen-rich gas mixture which is taken off and made available to a fuel cell stack.

The invention taught in the German first publication DE 10 2010 004 787 A1 relates to the production of synthesis gas by partial oxidation of liquid or gaseous, carbon-containing fuel in the presence of an oxygen-containing oxidant by means of a structurally simple burner, wherein the fuel, the oxidant and a moderator are fed separately to the burner and the fuel and the moderator are mixed in a mixing chamber of the burner before they are brought into contact with the oxidant. In order to reduce the load on the burner, especially during operation with transient conditions, the oxidant is introduced centrally into a combustion chamber through an outlet opening of the burner and the mixture of fuel and moderator is introduced concentrically around the oxidant through the outlet opening into the combustion chamber.

In the types of burner described for synthesis gas production, commencement of the partial oxidation reaction within the actual burner can occur, and the burner therefore has to be cooled by passing a liquid coolant through it. However, in the case of malfunctions in the coolant supply, the burner concerned can fail and an unplanned stoppage of the synthesis gas production plant can thus result.

SUMMARY OF THE INVENTION

It is therefore an object of the present invention to provide a burner for the production of synthesis gas by partial oxidation of carbon-containing starting materials, which does not have the abovementioned disadvantages of the burners known from the prior art.

This object is achieved by a burner having the features of claim 1 or, in an alternative embodiment, having the features of claim 2. Further embodiments of the burner of the invention are indicated in the respective dependent claims. The invention also provides a process for producing synthesis gas using the burner of the invention, with advantageous embodiments according to the dependent process claims.

Burner of the Invention:

Burner for producing synthesis gas by partial oxidation of liquid or gaseous, carbon-containing fuels in the presence of an oxygen-containing oxidant and a moderator containing steam and/or carbon dioxide, comprising
  means for separately feeding in the carbon-containing fuel, the oxygen-containing oxidant and the moderator,
  a central first feed channel having a circular cross section for the oxygen-containing oxidant,
  a second feed channel which coaxially and concentrically surrounds the first feed channel, forming an annular gap between the outer wall of the first feed channel and the inner wall of the second feed channel, through which the moderator is fed in,
  a third feed channel which coaxially and concentrically surrounds the second feed channel, forming an annular gap between the outer wall of the second feed channel and the inner wall of the third feed channel, through which the fuel is fed in, with the outer wall of the third feed channel forming the outer wall of the burner, where the feed channels are configured so that mixing of the fuel, the moderator and the oxidant occurs only outside the burner.

Burner of the Invention According to the Alternative Embodiment

Burner for producing synthesis gas by partial oxidation of liquid or gaseous, carbon-containing fuels in the presence of an oxygen-containing oxidant and a moderator containing steam and/or carbon dioxide, comprising
  means for separately introducing the carbon-containing fuel, the oxygen-containing oxidant and the moderator,
  a central first feed channel having a circular cross section for the fuel,
  a second feed channel which coaxially and concentrically surrounds the first feed channel, forming an annular gap between the outer wall of the first feed channel and the inner wall of the second feed channel, through which the moderator is fed in,
  a third feed channel which coaxially and concentrically surrounds the second feed channel, forming an annular gap between the outer wall of the second feed channel and the inner wall of the third feed channel, through which the oxygen-containing oxidant is fed in, with the outer wall of the third feed channel forming the outer wall of the burner,
  where the feed channels are configured so that mixing of the fuel, the moderator and the oxidant occurs only outside the burner.

Process of the Invention

Process for producing a synthesis gas comprising hydrogen and carbon oxides by partial oxidation of liquid or gaseous, carbon-containing fuel in the presence of an oxygen-containing oxidant and a moderator containing steam and/or carbon dioxide, comprising the following steps:
(a) provision of a burner according to the invention,
(b) feeding of the oxygen-containing oxidant to the first feed channel, of the moderator to the second feed channel and of the liquid or gaseous, carbon-containing fuel to the third feed channel,
(c) discharge of the unmixed streams of media from the burner and introduction of these streams into a reaction chamber downstream of the burner,
(d) reaction of the carbon-containing fuel with the oxygen-containing oxidant in the reaction chamber under conditions of partial oxidation,
(e) discharge of a crude synthesis gas from the reaction chamber and optional introduction of the crude synthesis gas into further conditioning or processing steps.

For the purposes of the present invention, the conditions of partial oxidation are the reaction and process conditions known per se to those skilled in the art, in particular in respect of temperature, pressure and residence time, as have been mentioned above by way of example and explained in detail in the relevant literature, and under which at least a partial conversion, but preferably industrially relevant conversions, of the starting materials into synthesis gas products such as CO and hydrogen occur(s).

The requirement that the feed channels be configured so that mixing of the fuel, the moderator and the oxidant occurs only outside the burner is satisfied by the size of the cross-sectional areas of the feed channels relative to the intended volume stream flowing through them being selected so that appropriately high flow velocities are achieved.

Certain embodiments of the invention are based on the recognition that the back-transfer of heat by means of thermal radiation from the burner flame can be identified as main cause for heating of a burner for synthesis gas production by means of partial oxidation of carbon-containing starting materials, which makes cooling of the burner necessary. The quantity of energy transferred here is inversely proportional to the square of the distance between burner flame and burner surface.

As a result of the media being conveyed according to the invention without mixing within the burner and the configuration of the burner opening, the media are mixed only within the reaction chamber and only there does flame formation occur. The detachment of the flame from the burner opening reduces the back-transfer of heat to the burner by means of thermal radiation compared to conventional burners in which a flame is formed within the burner itself.

BRIEF DESCRIPTION OF THE FIGURE

The single FIGURE shows a burner according to the invention.

DETAILED DESCRIPTION OF THE INVENTION

In a preferred embodiment of the burner of the invention, the outer wall of the burner, the dividing wall between the second feed channel and the third feed channel and the dividing wall between the first feed channel and the second feed channel and in a common plane which runs perpendicular to the longitudinal axis of the burner and forms the burner opening. This ensures that all media leave the burner simultaneously and unmixed, so that oxidation reactions within the burner are avoided.

In a particularly preferred embodiment, the burner of the invention has no facilities for passing a fluid cooling medium through the burner. This is made possible by the fact that the exothermic oxidation reactions proceed exclusively in the reaction chamber, and not within the burner, because of the configuration of the burner. In this way, the introduction of a fluid coolant, which is susceptible to malfunction, can be dispensed with. Precautions against the radiative heat coming from the reaction chamber and acting on the burner can be effected by means of appropriate selection of material or application of an insulating layer.

In the burner of the invention, at least one of the feed channels for the fuel, the moderator and/or the oxidant is preferably equipped with a swirl-inducing device which imparts rotational motion around the longitudinal axis of the burner and perpendicular to the flow direction to the corresponding stream of medium. This improves mixing of the corresponding medium with the medium exiting from the neighbouring flow channel.

However, it has to be ensured that the mixing occurs exclusively outside the burner and no backmixing with media fractions still present within the burner, which could lead to undesirable oxidation reactions within the burner, occurs.

Furthermore, preference is given to at least two of the feed channels being equipped with swirl-inducing devices, with the directions of rotation imparted to the media flowing through the at least two feed channels being counter to one another relative to the longitudinal axis of the burner. This effects a further improvement in the mixing of the corresponding medium with the medium exiting from the neighbouring flow channel.

In a particularly preferred embodiment of the burner of the invention, all feed channels are equipped with swirl-inducing devices, with the directions of rotation of the media flowing through the first feed channel and the third feed channel being the same relative to the longitudinal axis of the burner and the direction of rotation of the moderator flowing through the second feed channel being counter thereto. In this way, mixing of the corresponding medium with the medium exiting from the neighbouring flow channel is maximized. As in the case of the two embodiments explained above, it has to be ensured that the mixing occurs exclusively outside the burner and no backmixing with media fractions still present within the burner, which could lead to undesirable oxidation reactions within the burner, occurs.

In all embodiments of the burner in which a single feed channel or a plurality of feed channels is/are equipped with swirl-inducing devices, it has to be ensured that the flow velocity of the corresponding medium in the direction of the longitudinal axis of the burner is still sufficiently great to ensure the desired detachment of the burner flame from the burner mouth. In particular, the velocity vector in the direction of the longitudinal axis of the burner should be greater than the velocity vector perpendicular to the longitudinal axis of the burner.

In a preferred embodiment of the process of the invention for producing synthesis gas, the exit velocity of the moderator from the burner mouth is set so that it is in the range from 20 to 200 m/s, preferably from 50 to 150 m/s, most preferably from 80 to 120 m/s.

The setting of the exit velocity of the moderator from the burner mouth is effected by setting of an appropriate moderator volume flow and the dimensioning of the exit area of the second feed channel.

In a further preferred embodiment of the process of the invention for producing synthesis gas, the ratio of the exit velocities of moderator to oxidant is in the range from 0.2 to 2.5, preferably from 0.6 to 2.0, most preferably from 1.0 to 1.6. The setting of the exit velocities of the media mentioned from the burner mouth is effected by setting of the appropriate volume flows and the dimensioning of the exit area of the associated feed channels.

In a further preferred embodiment of the process of the invention for producing synthesis gas, the ratio of the exit velocities of moderator to fuel is in the range from 0.2 to 2.0, preferably from 0.4 to 1.6, most preferably from 0.6 to 1.2. The setting of the exit velocities of the media mentioned from the burner mouth is effected by setting of the appropriate volume flows and the dimensioning of the exit areas of the associated feed channels.

In a further aspect of the process of the invention, the exit velocity of the moderator is kept constant when the exit velocity of the oxidant and/or of the fuel is reduced.

In a further embodiment of the process of the invention, carbon dioxide is separated off from the crude synthesis gas in at least one of the further conditioning or processing steps and at least partly recirculated as moderator to the burner. The carbon dioxide can be separated off using gas scrubbing processes known per se, for example the Rectisol® process. It is advantageous here that the carbon dioxide used as moderator component is itself partly converted into carbon monoxide. This further embodiment is therefore particularly suitable for a process for producing carbon monoxide-rich synthesis gases.

Working Example

Further embodiments, advantages and possible uses of the invention can also be derived from the following description of working examples and the drawing. Here, all features described and/or shown pictorially form, on their own or in any combination, the invention, regardless of how they are combined in the claims or the back-references.

The burner 1 according to the invention depicted in the FIGURE is supplied via the conduits 10, 20 and 30 with the oxidant, for example pure oxygen, the moderator, for example a steam/carbon dioxide mixture, and the fuel, for example natural gas. The oxidant is fed via conduit 10 into the central, first feed channel 11 which has a circular cross section. The second feed channel 21 coaxially and concentrically surrounds the first feed channel; the annular gap thus formed between the outer wall of the first feed channel and the inner wall of the second feed channel serves to accommodate the moderator which is supplied via conduit 20. The burner further comprises a third feed channel 31 which coaxially and concentrically surrounds the second feed channel, with an annular gap through which the fuel supplied via conduit 30 is fed in being formed between the outer wall of the second feed channel and the inner wall of the third feed channel and with the outer wall of the third feed channel forming the outer wall 35 of the burner.

The outer wall 35 of the burner, the dividing wall between the second feed channel and the third feed channel 31, 21 and the dividing wall between the first feed channel and the second feed channel 21, 11 end in a common plane A-A', which runs perpendicularly to the longitudinal axis L of the burner and forms the burner mouth.

As a result of the conveying according to the invention of the media without mixing within the burner and the configuration of the burner mouth, the media are mixed only within the reaction chamber 40 and flame formation occurs only there. The detachment of the flame 50 from the burner mouth reduces the heat transfer back to the burner, which occurs primarily by means of thermal radiation, compared to conventional burners in the case of which a flame is formed within the burner itself.

Consequently, no means or devices for passing a fluid coolant through the burner are provided in the case of the burner shown in the FIGURE.

The working example which has been explained above and is schematically shown in the FIGURE also applies in an analogous way to the embodiment according to claim 2 with switched conveying of the media in respect of the fuel and the oxidant. Accordingly, the fuel is supplied via the conduit 10 and the first feed channel 11 and the oxidant is supplied via the conduit 30 and the third feed channel 31. As a result of the conveying according to the invention of the media without mixing within the burner and the configuration of the burner mouth, the media are mixed only within the reaction chamber 40 and flame formation occurs only there. The detachment of the flame 50 from the burner mouth reduces the heat transfer back to the burner, which occurs primarily by means of thermal radiation, compared to conventional burners in which a flame is formed within the burner itself.

INDUSTRIAL APPLICABILITY

The invention proposes a burner and a process for producing synthesis gas, which burner has a simple and robust construction and can in particular be operated uncooled, i.e. without a fluid cooling medium being passed through it. This gives economic advantages due to saving of the coolant.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

| List of reference symbols | |
|---|---|
| [1] | Burner |
| [10] | Supply conduit for oxidant |
| [11] | First feed channel |
| [20] | Supply conduit for moderator |
| [21] | Second feed channel |
| [30] | Supply conduit for fuel |
| [31] | Third feed channel |
| [35] | Outer wall of the burner |
| [40] | Reaction chamber |
| [50] | Flame |
| L | Longitudinal axis of burner |
| A-A' | Plane through burner mouth, perpendicular to longitudinal axis of the burner |

What is claimed is:

1. The process for producing a synthesis gas comprising hydrogen and carbon oxides by partial oxidation of liquid or gaseous, carbon-containing fuel in the presence of an oxygen-containing oxidant and a moderator containing steam and/or carbon dioxide, comprising the following steps:
   (a) providing a burner, wherein the burner comprises:
      means for separately feeding in the carbon-containing fuel, the oxygen-containing oxidant and the moderator,
      a central first feed channel having a circular cross section,
      a second feed channel which coaxially and concentrically surrounds the first feed channel, forming an annular gap between an outer wall of the first feed channel and an inner wall of the second feed channel,
      a third feed channel which coaxially and concentrically surrounds the second feed channel, forming an annular gap between an outer wall of the second feed channel and an inner wall of the third feed channel,
      wherein an outer wall of the burner is formed by an outer wall of the third feed channel, and
      an absence of cooling fluid channel disposed outside of the third feed channel;
   (b) feeding of the oxygen-containing oxidant to the first feed channel, of the moderator to the second feed channel and of the liquid or gaseous, carbon-containing fuel to the third feed channel;
   (c) discharging, without having been mixing therein, the carbon-containing fuel, the oxygen-containing oxidant, and the moderator from the burner and introducing the carbon-containing fuel, the oxygen-containing oxidant, and the moderator into a reaction chamber downstream of the burner;
   (d) reacting the carbon-containing fuel with the oxygen-containing oxidant in the reaction chamber under conditions of partial oxidation; and
   (e) discharging a crude synthesis gas from the reaction chamber,
   wherein the outer wall of the third feed channel, the dividing wall between the second feed channel and the third feed channel and the dividing wall between the first feed channel and the second feed channel end in a common plane which runs perpendicularly to the longitudinal axis of the burner and forms the burner mouth,
   wherein the feed channels are configured so that mixing of the fuel, the moderator, and the oxidant occurs only outside the burner.

2. The process of claim 1, further comprising the absence of a step of passing a fluid coolant through the burner.

3. The process of claim 2, wherein at least two of the feed channels are equipped with swirl-inducing devices, where the directions of rotation imparted to the media flowing through the at least two feed channels are counter to one another relative to the longitudinal axis of the burner.

4. The process of claim 1, wherein at least one of the feed channels is equipped with a swirl-inducing device.

5. The process of claim 4, wherein all feed channels are equipped with swirl-inducing devices, where the directions of rotation of the media which flow through the first feed channel and the third feed channel are the same relative to the longitudinal axis of the burner and the direction of rotation of the moderator flowing through the second feed channel is counter thereto.

6. The process of claim 1, wherein the exit velocity of the moderator from the burner mouth is in the range from 20 to 200 m/s.

7. The process of claim 1, wherein the ratio of the exit velocities of moderator to oxidant is in the range from 0.2 to 2.5.

8. The process of claim 1, wherein the ratio of exit velocities of moderator to fuel is in the range from 0.2 to 2.0.

9. The process of claim 1, wherein the exit velocity of the moderator is kept constant when the exit velocity of the oxidant and/or of the fuel is reduced.

10. The process of claim 1, wherein carbon dioxide is separated off from the crude synthesis gas in at least one of the further conditioning or processing steps and at least partly recirculated as moderator to the burner.

11. The process of claim 1, further comprising introducing the crude synthesis gas into further conditioning or processing steps.

* * * * *